US012774747B2

(12) United States Patent
Floßmann

(10) Patent No.: US 12,774,747 B2
(45) Date of Patent: Oct. 27, 2026

(54) GEAR SHIFT ACTUATOR

(71) Applicant: Kongsberg Automotive Holding 2 AS, Kongsberg (NO)

(72) Inventor: Sandra Floßmann, Dachau (DE)

(73) Assignee: KONGSBERG AUTOMOTIVE HOLDING 2 AS, Kongsberg (NO)

( * ) Notice: Subject to any disclaimer, the term of this patent is extended or adjusted under 35 U.S.C. 154(b) by 0 days.

(21) Appl. No.: 19/058,210

(22) Filed: Feb. 20, 2025

(65) Prior Publication Data

US 2025/0290565 A1 Sep. 18, 2025

(30) Foreign Application Priority Data

Mar. 13, 2024 (EP) .................................... 24163268

(51) Int. Cl.
*F16H 63/30* (2006.01)
*F16H 63/06* (2006.01)
*G01D 5/12* (2006.01)

(52) U.S. Cl.
CPC ....... *F16H 63/3023* (2013.01); *F16H 63/065* (2013.01); *G01D 5/12* (2013.01)

(58) Field of Classification Search
CPC ..... F16H 63/3023; F16H 63/065; G01D 5/12; F15B 15/2861
See application file for complete search history.

(56) References Cited

U.S. PATENT DOCUMENTS 8,833,234 B2 9/2014 Gronau et al.
11,112,003 B2 9/2021 Groetzinger et al.
2007/0028709 A1 2/2007 Futamura et al.
2007/0216402 A1 9/2007 Blessing et al.
2021/0062834 A1* 3/2021 Ichikawa ............ F15B 15/2807

FOREIGN PATENT DOCUMENTS

DE 102006011207 A1 9/2007
DE 102014211484 A1 12/2015
EP 2257712 A1 12/2010
EP 3744986 A1 12/2020
WO 2018172323 A1 9/2018

OTHER PUBLICATIONS

European Application No. 24163268.6 filed Mar. 13, 2024; Extended European Search Report dated Sep. 10, 2024; 9 pages.

* cited by examiner

*Primary Examiner* — Joseph Brown
*Assistant Examiner* — Gregory T Prather
(74) *Attorney, Agent, or Firm* — CANTOR COLBURN LLP

(57) ABSTRACT

A gear shift actuator for linearly moving a shift shaft of a transmission in a shift direction between a neutral and an engaged position includes an actuator housing configured to be mounted in a predetermined relative positioning to a housing of the transmission, a linear drive assembly including an actuation cylinder and a piston movably received in the actuation cylinder, an actuation rod fixed to the piston and arranged to be coupled to the shift shaft, a pressure fluid conduit arrangement configured to be coupled to a pressure fluid source and connected to the actuation cylinder for selectively supplying pressure fluid to the actuation cylinder for driving the piston to move in a shift direction between positions corresponding to neutral and engaged positions of the shift shaft, and a position sensor assembly configured to sense a position of the actuation rod in the shift direction.

20 Claims, 5 Drawing Sheets

GEAR SHIFT ACTUATOR

CROSS-REFERENCE TO RELATED APPLICATIONS

This application claims the benefit of European Patent Application Serial No. 24163268.6 filed Mar. 13, 2024, the disclosure of which is incorporated herein by reference in its entirety.

BACKGROUND

The present invention relates generally to a gear shift actuator.

SUMMARY

The present disclosure is directed to a gear shift actuator for linearly moving a shift shaft of a transmission in a shift direction between neutral and engaged positions, comprising an actuator housing to be mounted in a predetermined relative positioning to a housing of the transmission, a linear drive assembly including an actuation cylinder and a piston movably received in the actuation cylinder, an actuation rod fixed to the piston and arranged to be coupled to the shift shaft, a pressure fluid conduit arrangement to be coupled to a pressure fluid source and being connected to the actuation cylinder for selectively supplying pressure fluid to the actuation cylinder for driving the piston to move it in shift direction between positions corresponding to neutral and engaged positions of the shift shaft, a position sensor assembly adapted to sense the position of the actuation rod in shift direction, the position sensor assembly including a magnet arrangement connected to the piston or the actuation rod, and a magnetic field sensor which is mounted stationary in the actuator housing and which is connected to a control unit, which is adapted to analyze a signal of the magnetic field sensor to determine the position of the actuation rod.

A gear shift actuator is for example disclosed in DE 10 2006 011 207 A1. For example, a gear shift actuator may comprise an actuation rod which is driven by a linear drive assembly to move in a shift direction between shift positions. The linear drive assembly may include a hydraulic drive for moving the actuation rod in a shift direction (corresponding to a longitudinal direction of the actuation rod) between shift positions. A magnet is fixed to the actuation rod at a predetermined position in longitudinal direction along the actuation rod. A magnetic field sensor is mounted in a stationary manner with respect to a housing enclosing the gear shift actuator. The gear shift actuator described comprises a second magnet spaced apart from the first magnet in longitudinal direction along the actuation rod. The arrangement of the two magnets with respect to each other is such that their magnetic fields form a combined magnetic field such that the characteristic line of the magnetic field sensor as a function the actuation rod position in shift direction is approximately linear at least over a central part of the actuation range.

A gear shift actuator according to one or more embodiments does not utilize a second magnet spaced apart from the first in axial direction, but only one magnet arrangement at a predetermined longitudinal position along the piston of the pneumatic drive or along the actuation rod which is fixed to the piston. The magnet arrangement is in circumferential direction aligned with the magnetic field sensor to provide a good position sensitivity of the signal provided by the magnetic field sensor.

The end of the actuation rod which is intended to be connected to the shift shaft of a transmission is disposed within an opening of the housing of the gear shift actuator. The housing of the gear shift actuator is adapted to be coupled to a housing of the transmission in a predetermined relative positioning which typically is determined by openings in the housing of the gear shift actuator and in the transmission housing which must be aligned such that screws or other fasteners can be inserted and fixed to connect the gear shift actuator housing to the transmission housing. The relative rotational position of the actuation rod must be adjusted to the rotational position of the shift shaft. For certain applications several gear shift actuators have to be mounted to a housing, wherein there are two or more different predetermined rotational positionings of the shift shafts so that the gear shift actuators have to be adapted to fit to either one of the rotational positionings of the shift shafts. Such adjustment can be done by rotating the piston within the actuation cylinder (and the actuation rod which is fixed to the piston) to the predetermined rotational position of the shift shaft to which it is to be connected, whereby a rotation stop at the end of the actuation rod is aligned to a complementary rotation stop feature on the shift shaft. However, such rotation of the piston for adjusting the rotational positioning of the actuation rod to the predetermined rotational position of the shift shaft may also results in a rotation of the magnet arrangement with the respect to the magnetic field sensor which is stationary in the housing.

One or more embodiments may provide a gear shift actuator which can be adapted to multiple rotational positionings of a shift shaft to which the actuation rod of the gear shift actuator is to be connected, wherein the adjustment by a corresponding rotation of the piston should not affect the fidelity and position resolution of the position sensor assembly including a stationary magnetic field sensor.

According to one or more embodiments of the present disclosure, the magnet arrangement is configured with a circumferential extension about the longitudinal axis of the piston and the actuation rod between 45° and 220° so that the gear shift actuator is adaptable by rotation of the piston to multiple relative rotational coupling positions of the actuation rod with respect to the shift shaft.

It has been found to be advantageous for the reliability and accuracy of the measurements of the position sensor assembly if the magnetic field sensor is circumferentially located within the circumferential extension of the magnet arrangement with a certain safety margin to the circumferential edges of the magnet arrangement. For typical gear shift actuators, it has been found that this safety margin between the circumferential central position of the magnetic field sensor and one of the edges of the circumferential extension of the magnet arrangement should preferably be at least 20°. The circumferential extension of the magnet arrangement in the range between 45° and 220° allows to adapt the gear shift actuator for each pair of two relative rotational positionings between actuation rod and shift shaft for two rotational positionings which differ by a few degrees only near the lower end of the circumferential extension range of 45° to 220°, whereas close to the upper limit of the range the circumferential extension of the magnet arrangement allows to adapt the rotational positioning of the magnet arrangement to be aligned with the magnetic field sensor for each pair of two rotational positionings and for multiple rotational positionings of the actuation rod with respect to the shift shaft, including a safety margin of 20°. This is so because for each pair of two rotational positionings the rotational positionings are circumferentially spaced apart by at most 180° so that, by an appropriate rotation of the piston, the magnet arrangement is aligned to the pair of rotational positionings of the actuation rod shaft, including a safety margin which allows the magnetic field sensor to have a circumferential distance of at least 20° to a circumferential end of the magnet arrangement. By turning the piston and actuation rod by 180° it is possible to also cover the remaining circumferential range so that the gear shift actuator is adaptable to multiple rotational positionings. Therefore, in case that three or more gear shift actuators are to be mounted to a transmission housing it is also possible to adapt the rotational positioning of the actuation rods of the gear shift actuators to three ore more different predetermined rotational positionings of the associated shift shafts, wherein this is the case for all possible rotational positionings if the circumferential extension of the magnet arrangement is close to the upper limit of the range of 45° to 220°.

A circumferential extension of the magnet arrangement in the range of 45° to 220° may allow a rotational positioning of the magnet arrangement with respect to the magnetic field sensor such that tolerances of the shift shaft and further connected components inside of the transmission may be compensated without affecting the accuracy and resolution of the position measurements of the position sensor assembly. For the same reasons, the gear shift actuator with the circumferential extension of the magnet arrangement may be capable of compensating tear and wear of components connected to the actuation rod over the lifetime of the gear shift actuator and the associated transmission.

In one or more embodiments, the circumferential extension of the magnet arrangement is within the range 90° to 220°.

In one or more embodiments, the magnet arrangement comprises a plurality of magnets disposed in series distributed over the circumferential extension of the magnet arrangement.

In one or more embodiments, the magnet arrangement is formed by a single elongated, arcuate magnet extending over the circumferential extension of the magnet arrangement.

In one or more embodiments, the magnet arrangement is located in shift direction such that the magnet arrangement is aligned in shift direction with the magnetic field sensor when the gear shift actuator is in a position corresponding to the neutral position of the shift shaft. In this manner it may be ensured that the measuring conditions are symmetrical from neutral in a first direction to a first gear shift position and from neutral into a second, opposite direction to a second gear shift position.

In one or more embodiments, the magnet arrangement is held in position within a circumferentially extending slot of the piston by an annular guiding element fitted around the piston and having a holding portion which partially extends over the opening of the slot and partially covers the opening of the slot so that it abuts against a surface portion of the magnet arrangement, thereby securing the magnet arrangement within the slot.

DETAILED DESCRIPTION

Figure 3:
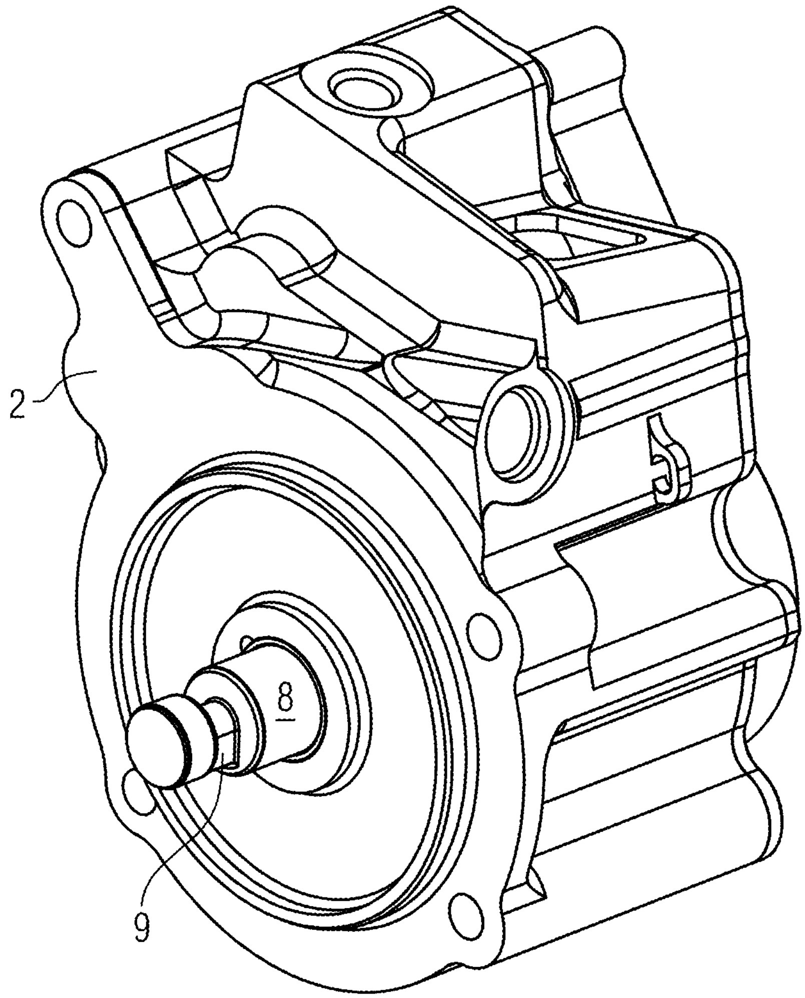
FIG. 3 is a perspective view of the gear shift actuator showing its housing with its interface which is to be mounted on a housing of a transmission.

FIG. 3 shows a perspective view of the housing of the gear shift actuator, wherein an interface with a plane surface is visible which is to be mounted on a housing of a transmission. The interface of the housing 2 comprises four holes which have to be aligned with a pattern of four corresponding holes in the housing of the transmission. Screws or other fasteners are inserted into the holes of the gear shift actuator housing and the housing of the transmission to fix the gear shift actuator housing at the transmission housing. The location of the four mounting holes of the housing 2 of the gear shift actuator and of the housing of the transmission determines the mounting position of the gear shift actuator at the housing of the transmission.

Also shown in FIG. 3 is an end portion of an actuation rod 8 which projects from an opening in the housing of the gear shift actuator. An outer end portion of the actuation rod 8 is provided with a surface stop 9 (flat or key surface) which must be rotationally aligned to a cooperating rotational stop feature of the shift shaft to which the actuation rod 8 is to be connected.

In certain applications two or more gear shift actuators have to be mounted on a housing, wherein each of the gear shift actuators has to be connected to an associated shift shaft in the transmission. It is also possible that there are two different rotational positionings of shift shaft with respect to the mounting position of the gear shift actuator at the housing of the transmission. In such situations it is necessary to adapt at least for some of the gear shift actuators to be mounted on the transmission the rotational positioning of the actuation rod 8 to align it with the rotational positioning of the shift shaft to which it is to be connected.

Figure 1:
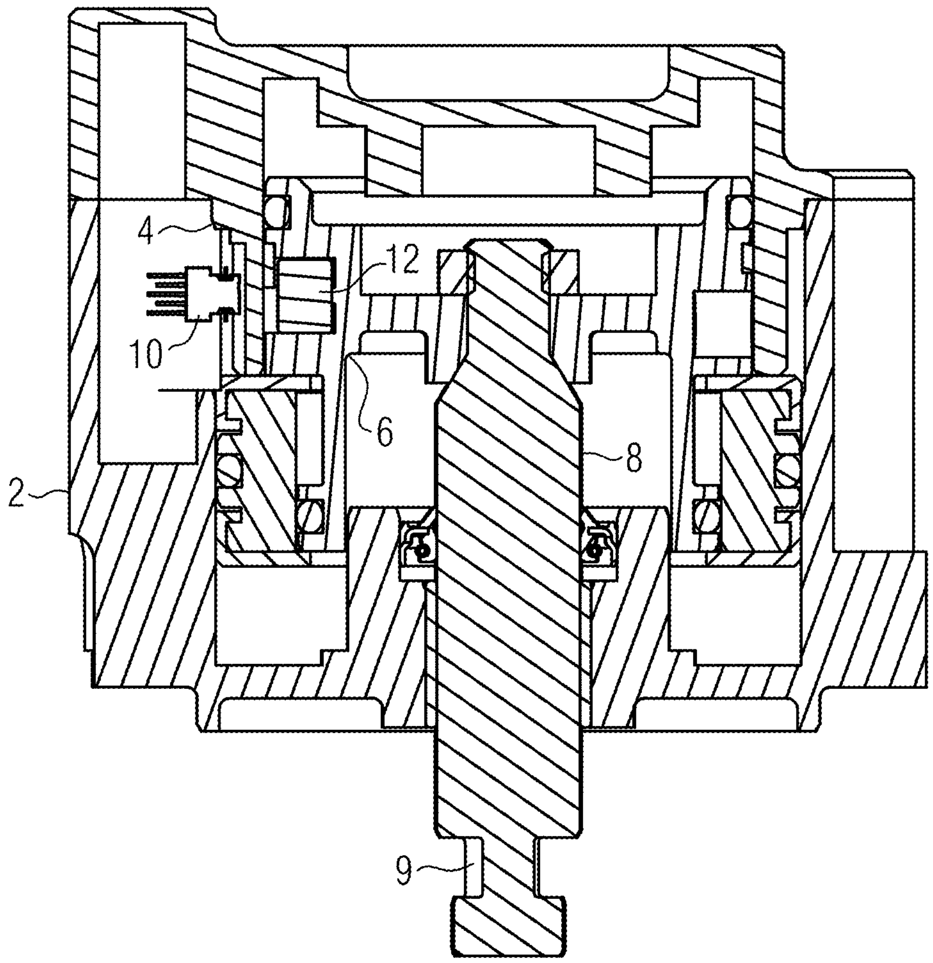
FIG. 1 is a cross-sectional view of the gear shift actuator.
Figure 2:
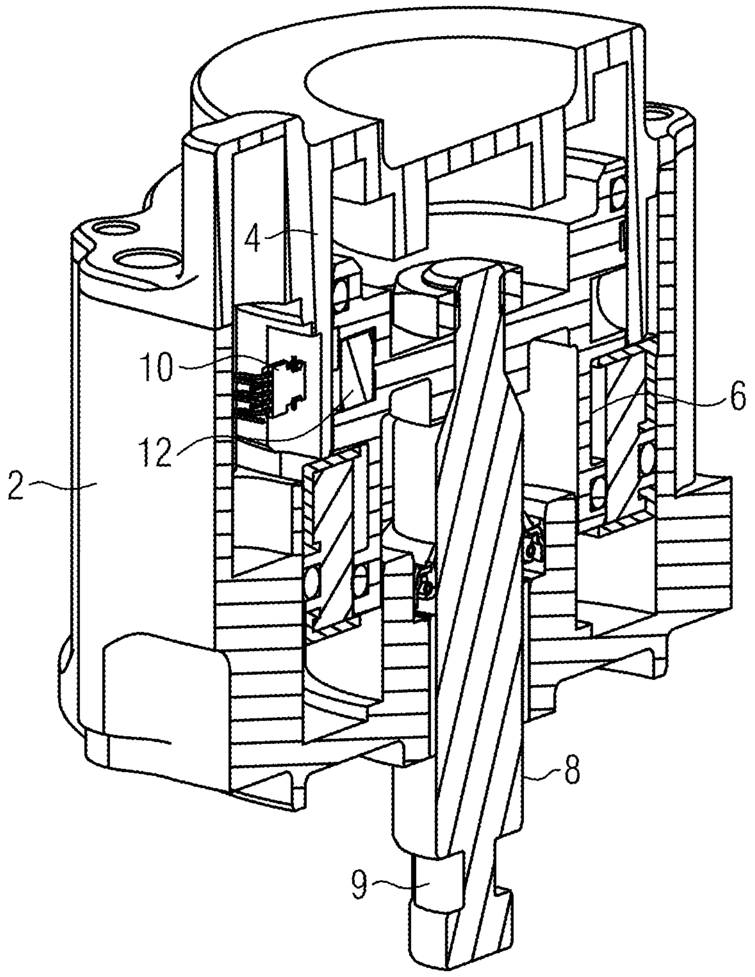
FIG. 2 is a cross-sectional perspective view of the gear shift actuator.

In FIGS. 1 and 2, the housing 2 of the gear shift actuator is shown in cross-section. As can be seen in FIGS. 1 and 2, an actuation cylinder 4 is mounted such that it is partly within the housing and partly forms an extension of the housing 2. Inside of the actuation cylinder 4 a piston 6 is located which is displaceable inside the actuation cylinder 4 (in vertical direction in the views of FIGS. 1 and 2). The actuation cylinder 4 is connected to a pressure fluid conduit arrangement (not shown in further detail) which is arranged for selectively supplying pressure fluid to the actuation cylinder 4 for driving the piston 6 to move it in shift direction to a desired shift position. The actuation rod 8 is disposed coaxially with the piston 6 and is fixed in a central opening of the piston 6.

Referring further to FIGS. 1 and 2, a magnet arrangement 12 is connected to the piston 6. A magnetic field sensor 10 is mounted stationary in the housing 2 of the gear shift actuator. The magnetic field sensor 10 and the magnetic arrangement 12 are circumferentially aligned and facing each other. The magnetic field sensor 10 and the magnet arrangement 12 form part of the position sensor assembly. For this purpose, the magnetic field sensor 10 is connected to a control unit (not shown) which is arranged to analyze the magnetic field measurement signals of the magnetic field sensor 10 to derive a position measurement for the piston and actuation rod assembly 6, 8 in shift direction. Position values can be derived by analyzing two spatial components of the magnetic field which vary in a predetermined manner as a function of a varying position of the magnet arrangement 12 in shift direction. Algorithms to determine a linear position in shift direction from two spatial components of the magnetic field strength are known and will not be described in further detail here.

Figure 4:
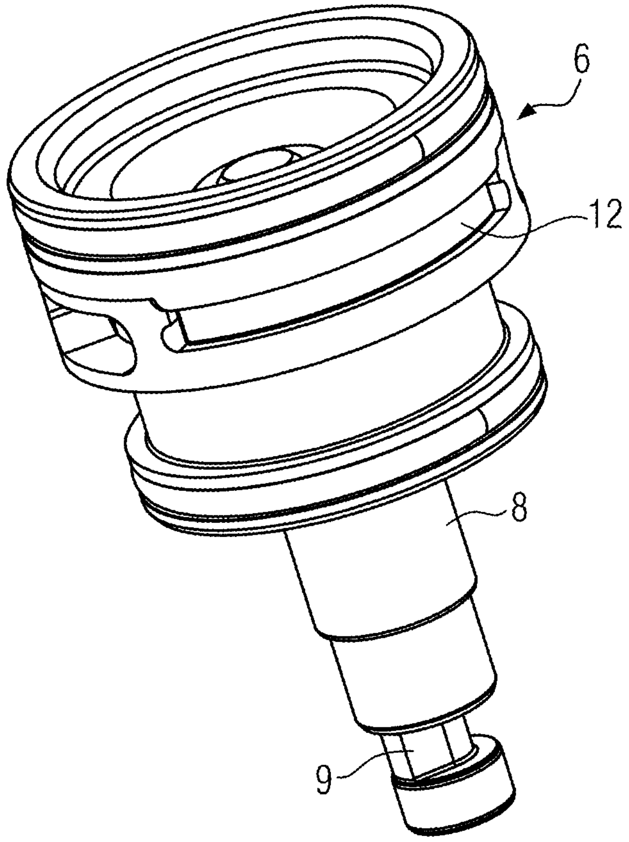
FIG. 4 is a perspective view of a fixed assembly of piston and actuation rod of the gear shift actuator.

FIG. 4 is a perspective view of the assembly of the piston 6 and the actuation rod 8 connected to it. The magnet arrangement 12 is formed by a single arcuate magnet that is disposed in a circumferentially extending recess in the piston 6, wherein the surface of the arcuate magnet arrangement 12 is within the recess of the piston 6 such that the surface of the magnet arrangement 12 is slightly below the surrounding surface areas of the piston 6.

The magnet arrangement 12 is circumferentially extending over part of the circumference of the piston 6, in the example shown the circumferential extension of the magnet arrangement 12 is slightly above 90°.

Figure 5A:
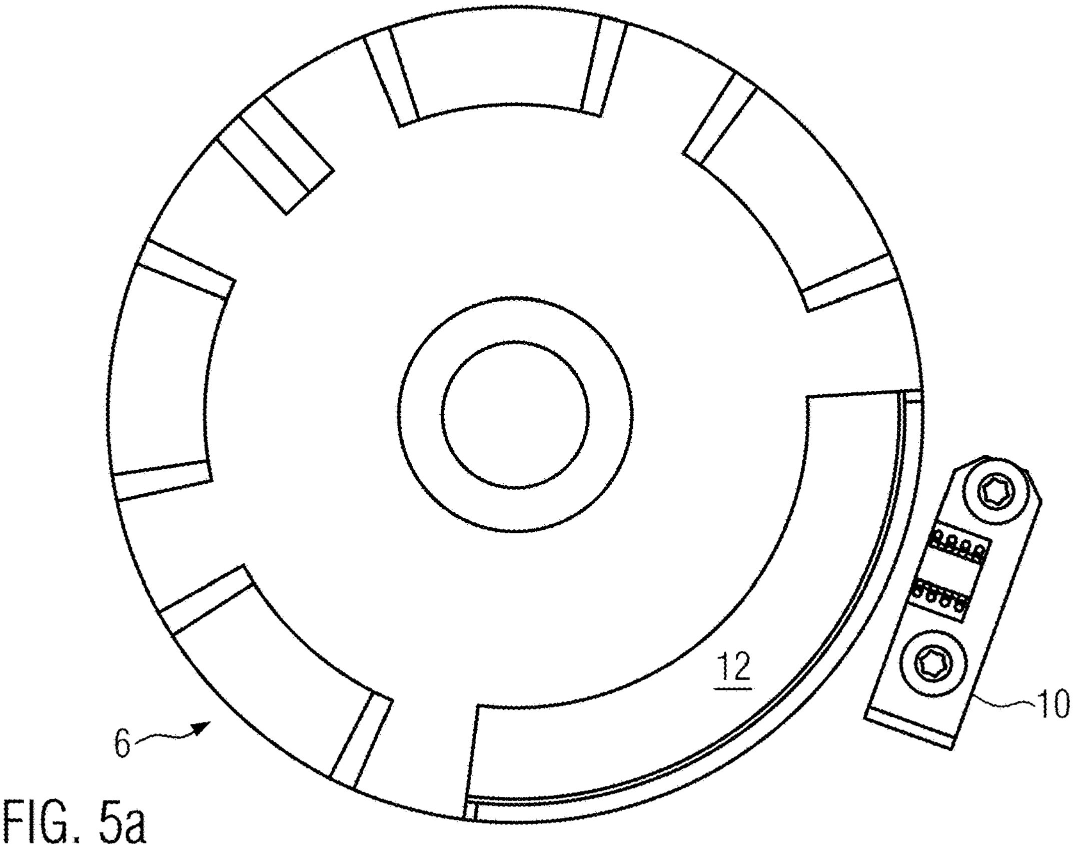
FIGS. 5*a* and 5*b* are schematical cross-sectional views of the piston of the gear shift actuator and of a stationary magnet field sensor located adjacent to the piston in the gear shift actuator for a first and a second rotational positioning of the piston, respectively.
Figure 5B:
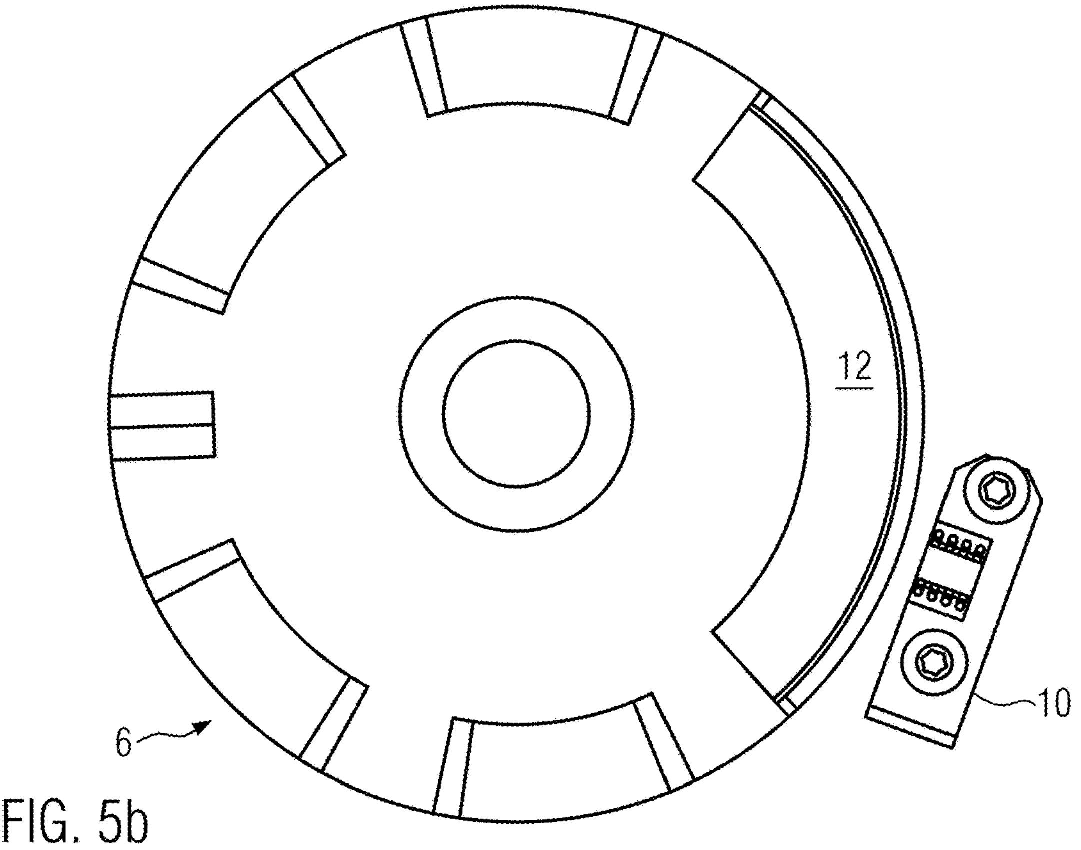

FIGS. 5*a* and 5*b* shows schematical cross-sectional views of the piston, wherein the cross-section is taken in a plane such that the magnet arrangement 12 is visible. In the views of FIGS. 5*a* and 5*b* the longitudinal axis of the piston 6 and of the coaxial actuation rod 8 is extending perpendicular to the Figure plane. The magnetic field sensor 10 which is mounted stationary in the housing of the gear shift actuator is shown adjacent to the piston 6. Piston 6 and actuation rod 8 are moving in longitudinal direction of the actuation rod 8 in shift direction (perpendicular to the Figure plane).

In the configuration of FIG. 5*a* the piston 6 of the gear shift actuator is adapted to fit to a first predetermined rotational positioning of the shift shaft to which the outer end of the actuation rod 8 is to be connected.

In the configuration of FIG. 5*b* the piston 6 has been turned by about 45° in anti-clockwise direction to adapt the rotational positioning of the actuation rod 8 connected to the piston 6 to a second predetermined rotational positioning of a shift shaft which differs in circumferential direction by about 45° from the first predetermined rotational positioning of the shift shaft in the situation of FIG. 5*a*.

As can be seen in FIGS. 5*a* and 5*b* the sensitive central part of the magnetic field sensor 10 is within the circumferential range covered by the magnet arrangement 12, wherein the sensitive magnetic field sensor part is in both configurations by more than a safety margin of 20° in circumferential direction distanced from the circumferential end of the magnet arrangement 12.

The invention claimed is:

1. A gear shift actuator for linearly moving a shift shaft of a transmission in a shift direction between a neutral and an engaged position, comprising:

an actuator housing configured to be mounted in a predetermined relative positioning to a housing of the transmission;

a linear drive assembly including an actuation cylinder and a piston movably received in the actuation cylinder;

an actuation rod fixed to the piston and arranged to be coupled to the shift shaft;

a pressure fluid conduit arrangement configured to be coupled to a pressure fluid source and connected to the actuation cylinder for selectively supplying pressure fluid to the actuation cylinder for driving the piston to move in a shift direction between positions corresponding to neutral and engaged positions of the shift shaft;

a position sensor assembly configured to sense a position of the actuation rod in the shift direction, the position sensor assembly including a magnet arrangement connected to the piston or the actuation rod; and a magnetic field sensor mounted stationary in the actuator housing and connected to a controller adapted to analyze a signal of the magnetic field sensor to determine the position of the actuation rod, wherein the magnet arrangement is configured with a circumferential extension around the circumference of the piston or the actuation rod between 45° and 220° so that the gear shift actuator is adaptable by rotation of the piston to multiple relative rotational coupling positions of the actuation rod with respect to the shift shaft, and wherein the rotation of the piston rotates the magnet arrangement with respect to the magnetic field sensor, the magnetic field sensor configured to sense different circumferential positions of the magnet arrangement due to the circumferential extension of the magnet arrangement.

2. The gear shift actuator according to claim 1, wherein the circumferential extension of the magnet arrangement is between 90° and 220°.

3. The gear shift actuator according to claim 2, wherein the magnet arrangement comprises a plurality of magnets distributed over the circumferential extension of the magnet arrangement.

4. The gear shift actuator according to claim 3, wherein the magnet arrangement is located in shift direction such that the magnet arrangement is aligned in shift direction with the magnetic field sensor when the gear shift actuator is in a position corresponding to the neutral position of the shift shaft.

5. The gear shift actuator according to claim 3, wherein the magnet arrangement is held in position within a circumferentially extending slot of the piston by an annular guiding element fitted around the piston and having a holding portion which partially covers the slot, thereby securing the magnet arrangement within the slot.

6. The gear shift actuator according to claim 2, wherein the magnet arrangement comprises a single elongated, arcuate magnet extending over the circumferential extension of the magnet arrangement.

7. The gear shift actuator according to claim 6, wherein the magnet arrangement is located in shift direction such that the magnet arrangement is aligned in shift direction with the magnetic field sensor when the gear shift actuator is in a position corresponding to the neutral position of the shift shaft.

8. The gear shift actuator according to claim 6, wherein the magnet arrangement is held in position within a circumferentially extending slot of the piston by an annular guiding element fitted around the piston and having a holding portion which partially covers the slot, thereby securing the magnet arrangement within the slot.

9. The gear shift actuator according to claim 2, wherein the magnet arrangement is located in shift direction such that the magnet arrangement is aligned in shift direction with the magnetic field sensor when the gear shift actuator is in a position corresponding to the neutral position of the shift shaft.

10. The gear shift actuator according to claim 2, wherein the magnet arrangement is held in position within a circumferentially extending slot of the piston by an annular guiding element fitted around the piston and having a holding portion which partially covers the slot, thereby securing the magnet arrangement within the slot.

11. The gear shift actuator according to claim 1, wherein the magnet arrangement comprises a plurality of magnets distributed over the circumferential extension of the magnet arrangement.

12. The gear shift actuator according to claim 11, wherein the magnet arrangement is located in shift direction such that the magnet arrangement is aligned in shift direction with the magnetic field sensor when the gear shift actuator is in a position corresponding to the neutral position of the shift shaft.

13. The gear shift actuator according to claim 11, wherein the magnet arrangement is held in position within a circumferentially extending slot of the piston by an annular guiding element fitted around the piston and having a holding portion which partially covers the slot, thereby securing the magnet arrangement within the slot.

14. The gear shift actuator according to claim 1, wherein the magnet arrangement comprises a single elongated, arcuate magnet extending over the circumferential extension of the magnet arrangement.

15. The gear shift actuator according to claim 14, wherein the magnet arrangement is located in shift direction such that the magnet arrangement is aligned in shift direction with the magnetic field sensor when the gear shift actuator is in a position corresponding to the neutral position of the shift shaft.

16. The gear shift actuator according to claim 14, wherein the magnet arrangement is held in position within a circumferentially extending slot of the piston by an annular guiding element fitted around the piston and having a holding portion which partially covers the slot, thereby securing the magnet arrangement within the slot.

17. The gear shift actuator according to claim 1, wherein the magnet arrangement is located in shift direction such that the magnet arrangement is aligned in shift direction with the magnetic field sensor when the gear shift actuator is in a position corresponding to the neutral position of the shift shaft.

18. The gear shift actuator according to claim 17, wherein the magnet arrangement is held in position within a circumferentially extending slot of the piston by an annular guiding element fitted around the piston and having a holding portion which partially covers the slot, thereby securing the magnet arrangement within the slot.

19. The gear shift actuator according to claim 1, wherein the magnet arrangement is held in position within a circumferentially extending slot of the piston by an annular guiding element fitted around the piston and having a holding portion which partially covers the slot, thereby securing the magnet arrangement within the slot.

20. The gear shift actuator according to claim 19, wherein the magnet arrangement is held in position within a circumferentially extending slot of the piston by an annular guiding element fitted around the piston and having a holding portion which partially covers the slot, thereby securing the magnet arrangement within the slot.

* * * * *